(12) United States Patent
Pearce

(10) Patent No.: US 7,874,375 B2
(45) Date of Patent: Jan. 25, 2011

(54) SEED ROW SHAPER ATTACHMENT FOR A POWER TILLER

(76) Inventor: Dennis R. Pearce, 46 S, Lawson Rd., Poquoson, VA (US) 23662

(*) Notice: Subject to any disclaimer, the term of this patent is extended or adjusted under 35 U.S.C. 154(b) by 58 days.

(21) Appl. No.: 12/287,018

(22) Filed: Oct. 6, 2008

(65) Prior Publication Data

US 2010/0083886 A1    Apr. 8, 2010

(51) Int. Cl.
*A01B 33/00* (2006.01)
*E01H 4/00* (2006.01)
*E01H 5/09* (2006.01)
*E01H 8/06* (2006.01)

(52) U.S. Cl. ................ 172/119; 172/122; 172/123; 37/213; 37/223; 37/258

(58) Field of Classification Search ......... 172/118–123; 37/209–213, 223, 244–262
See application file for complete search history.

(56) References Cited

U.S. PATENT DOCUMENTS

| | | | |
|---|---|---|---|
| 1,225,547 A * | 5/1917 | Wilson ................ | 37/386 |
| 2,975,842 A | 3/1961 | Mostrong | |
| 3,456,607 A | 7/1969 | West | |
| 3,477,514 A * | 11/1969 | Woitas ................ | 172/42 |
| 3,483,929 A * | 12/1969 | Macintyre et al. ........ | 172/63 |
| 3,557,883 A | 1/1971 | Shader | |
| 4,355,588 A | 10/1982 | Armstrong | |
| 4,618,004 A | 10/1986 | Howard | |
| 5,082,063 A | 1/1992 | Sidders | |
| 5,524,711 A | 6/1996 | Harris | |
| 6,681,868 B2 | 1/2004 | Kovach | |
| 6,871,709 B2 | 3/2005 | Knobloch | |
| 7,156,186 B2 | 1/2007 | Knobloch | |
| 2003/0226670 A1 | 12/2003 | Knobloch | |

* cited by examiner

*Primary Examiner*—Christopher J. Novosad
(74) *Attorney, Agent, or Firm*—William G. Sykes

(57) ABSTRACT

An attachment for a conventional, walk-behind power tiller for forming seed rows and adjacent furrows wherein an auger disposed perpendicularly to the seed row being formed has a larger diameter at its proximal ends and a smaller diameter at its central, inner end. The auger is rotated using power derived from the tiller to which the novel seed row forming apparatus is attached. In operation, the larger diameter outer portions of the auger dig a furrow and move the disturbed soil inwardly along the diminishing diameter of the auger, thereby depositing the soil from each side of the auger into a central berm or seed row. The apparatus provides seed row-forming capability for use with small rotary tillers and provides minimum soil tillage while readily forming planting rows.

9 Claims, 8 Drawing Sheets

Prior Art

SEED ROW SHAPER ATTACHMENT FOR A POWER TILLER

FIELD OF THE INVENTION

The invention pertains to devices for preparing seed rows and, more particularly, to an attachment for a power tiller for automatically forming seed rows.

BACKGROUND OF THE INVENTION

Convention agricultural planting practice has traditionally included major tillage, for example, plowing, harrowing, and other steps that have greatly disturbed the ground being prepared. In addition to soil disturbance, such practices require large amounts of time and money, typically requiring expensive, sophisticated equipment. Further, by repeating such tillage year after year, the land's natural ability to protect itself is constantly compromised. Such extensive cultivation also disrupts the life and reproduction cycles of microorganisms and worms. Microorganisms and worms tend to aerate the soil thereby providing an enhanced growing environment for the crop being planted. Both worms and microorganisms are also a continuous source or organic matter that enriches the soil and provides nutrients to the growing crop.

Certain root crops (e.g., carrots, beets, etc.) are best grown in elevated rows. Further, certain irrigation practices require that crops be planted in elevated rows between water conveying channels. The formation of such rows and irrigation channels has in the past presented challenges.

Therefore, there continues to be a need for tillage practices that are less disruptive of the soil than the practices of the prior art when preparing the land for planting a crop. Such enhanced tillage practices would preserve microorganisms and worms found in the top layer of the soil. Further, there is a need for a relatively inexpensive apparatus and method to readily form planting rows allowing irrigation water to flow in channels alongside such planting rows and for use on relatively small plots of land.

DISCUSSION OF THE RELATED ART

Several attempts to solve the aforementioned problems may be found in the prior art. For example, U.S. Pat. No. RE. 25,439 for PLANT BED SHAPER, issued Sep. 3, 1963 to Casey M. Mostrong provides a device drawn behind a wheeled tractor for forming raised beds, compacting the sides thereof, and forming irrigation trenches between the formed rows.

U.S. Pat. No. 3,456,607 for AGRICULTURAL DEVICE, issued Jul. 22, 1969 to Wilber C. West teaches a supporting frame carrying a harrow and a row shaper. The WEST apparatus is also adapted for drawing by a tractor or similar motive power source.

U.S. Pat. No. 3,557,883 for SEED BED FORMING IMPLEMENT, issued Aug. 1, 1968 to Benjamin A. Shader disclosed a seedbed forming apparatus for forming and compacting parallel hills and furrows adapted for attachment to a conventional agricultural tractor.

U.S. Pat. No. 4,355,588 for TRANSPLANTING MACHINE, issued Oct. 26, 1982 to Errol C. Armstrong et al. shows a machine for transplanting soil plugs.

U.S. Pat. No. 4,618,004 for METHOD AND APPARATUS FOR BUILDING BORDERS, issued Oct. 21, 1986 to Cecil J. Howard teaches an apparatus for forming water-containing ridges and borders on agricultural fields.

U.S. Pat. No. 5,524,711 for AGRICULTURAL IMPLEMENT FOR FORMING PLANTING ROWS, issued Jun. 11, 1996 to Tom J. Harris disclose and agricultural implement for forming planting rows with minimum tillage.

United States Published Patent Application No. 2003/0226670 for STRIP-TILL CONDITIONING ROTARY WHEEL, published Dec. 11, 2003 upon application by Dean Knobloch et al. provides a strip-till primary tillage system using a rotary wheel having a particular cross-sectional profile to form the tilled soil into uniform, raised berms ideal for planting.

U.S. Pat. No. 6,681,868 for RIP STRIP PRIMARY TILLAGE SYSTEM, issued Jan. 27, 2004 to Michael G. Kovach et al. teaches another agricultural tillage implement design for drawing behind an agricultural tractor wherein a coulter, a tillage shank, soil-gathering blades, and a rotary reel cooperate to successively till the soil.

U.S. Pat. No. 6,871,709 for STRIP-TILL PRIMARY TILLAGE SYSTEM, issued Mar. 29, 2005 to Dean Knobloch et al. teaches another strip-tillage implement utilizing multiple apparatus to strip-till and otherwise condition land for farming.

U.S. Pat. No. 7,156,186 for STRIP-TILL CONDITIONING ROTARY REEL, issued Jan. 2, 2007 to Dean Knobloch et al. teaches a rotary reel for use as a portion of strip-tillage apparatus.

None of the patents and published patent application, when taken singly, or in any combination are seen to teach or suggest the novel seed row shaper attachment for a power tiller of the present invention.

SUMMARY OF THE INVENTION

In accordance with the present invention there is provided an attachment for a conventional, walk-behind power (i.e., "garden") tiller for forming seed rows and adjacent furrows. A symmetrical auger disposed perpendicularly to the seed row being formed has a larger diameter at its proximal ends and a smaller diameter at it mid section. The auger is rotated using power derived from the power tiller to which the novel seed row forming apparatus is attached. In operation, the larger diameter outer portions of the auger dig a furrow and move the soil disturbed thereby inwardly along the diminishing diameter of the auger, thereby depositing the soil from each side of the auger into a central berm or seed row. The apparatus of the invention provides seed row forming capability for use with small rotary tillers and provides minimum soil tillage while readily forming planting rows.

It is, therefore, an object of the invention to provide a seed row forming apparatus for use in cooperation with a conventional, walk behind rotary power tiller.

It is another object of the invention to provide a seed row forming apparatus that may replace the conventional tilling tines of a conventional, walk behind rotary power tiller.

It is an additional object of the invention to provide a seed row forming apparatus that utilizes a varying-diameter auger to form a berm and surrounding, parallel furrows.

It is a further object of the invention to provide a seed row forming apparatus that provides minimum tillage of the soil.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The present invention provides a seed row shaping attachment for use in cooperation with a conventional, walk-behind, power tiller. A novel auger having a decreasing diameter between its outer and inner ends replaces the conventional tiller tines.

Figure 1:
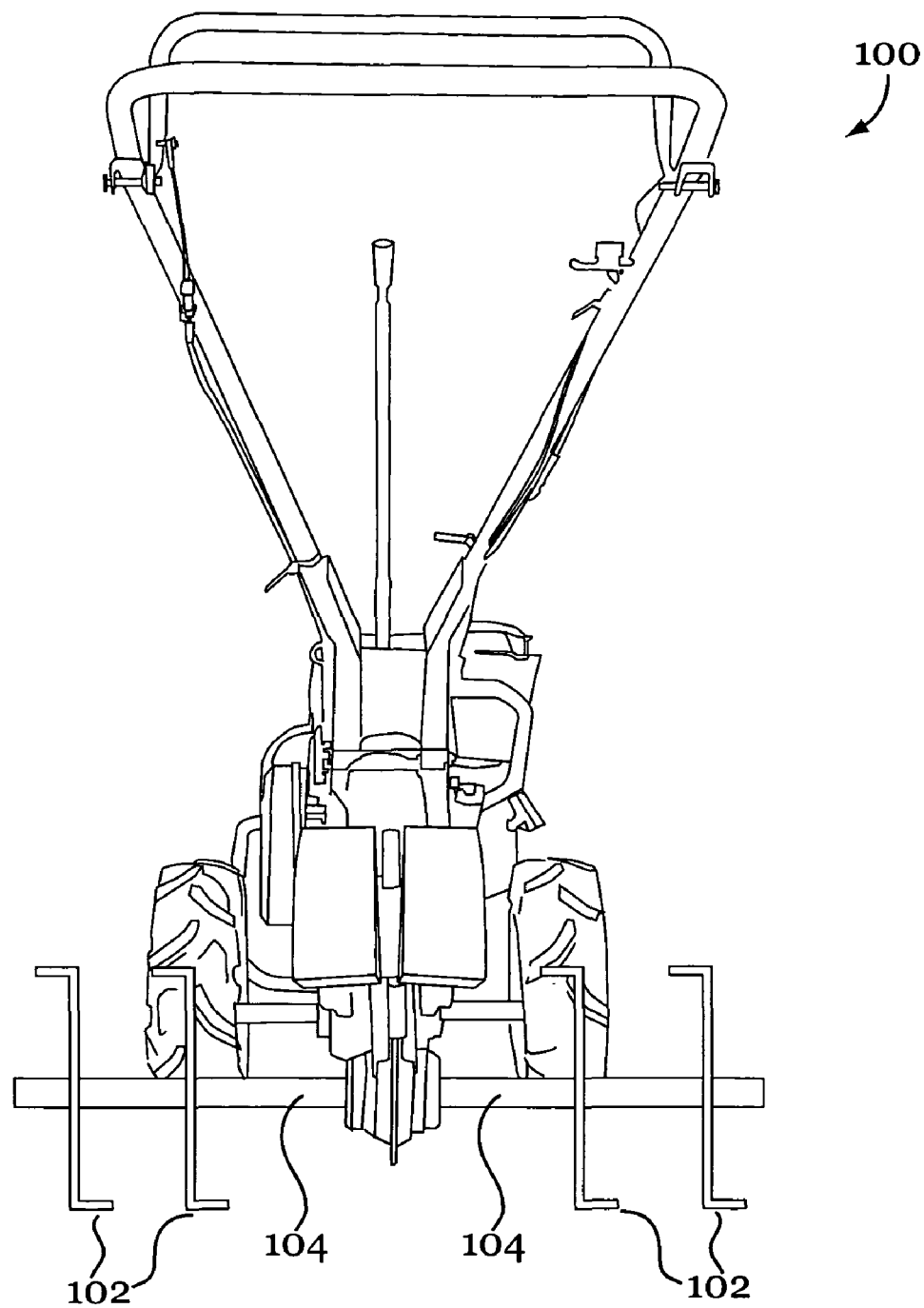
FIG. 1 is a rear elevational view of a conventional walk-behind power tiller of the prior art.

Referring first to FIG. 1, there is shown a rear elevational view of a conventional, walk-behind power tiller of the prior art, generally at reference number 100. Tiller tines 102 are disposed on opposite ends of a driven axle 104 that is connected to a drive mechanism 106 that is powered by an engine 108 of power tiller 100.

In operation, engine 108 rotates axle 104 and tines 102 through a drive train 106. A clutch, not specifically identified, may be used to interrupt and apply rotational force to axle 104.

Such tillers 100 are believed to be well known to those of skill in the art are not further described herein. The specific construction of tiller 100 forms no part of the present invention. It will be recognized that the inventive seed row forming auger construction of the invention may be applied to devices other than tillers (e.g. lawn or garden tractors or other similar motive devices) having designs different than tiller 100. Consequently, the invention is not limited to the specific tiller chosen for purposes of disclosure. Rather, the invention includes the novel seed row shaping attachment adapted for use with any motive device.

Figure 2:
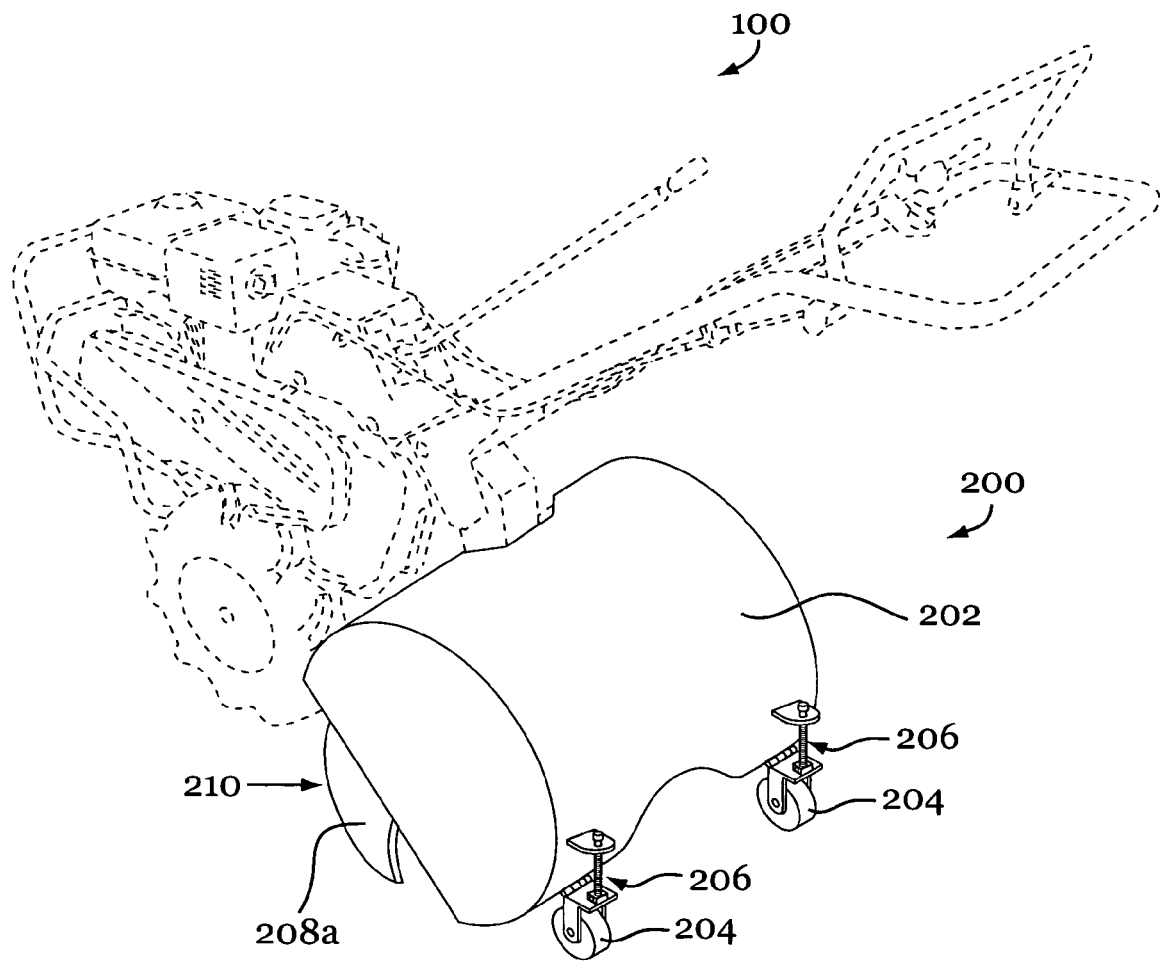
FIG. 2 is a rear, perspective view of the seed row shaper of the invention in its intended operating environment and showing an outer housing in place.
Figure 3:
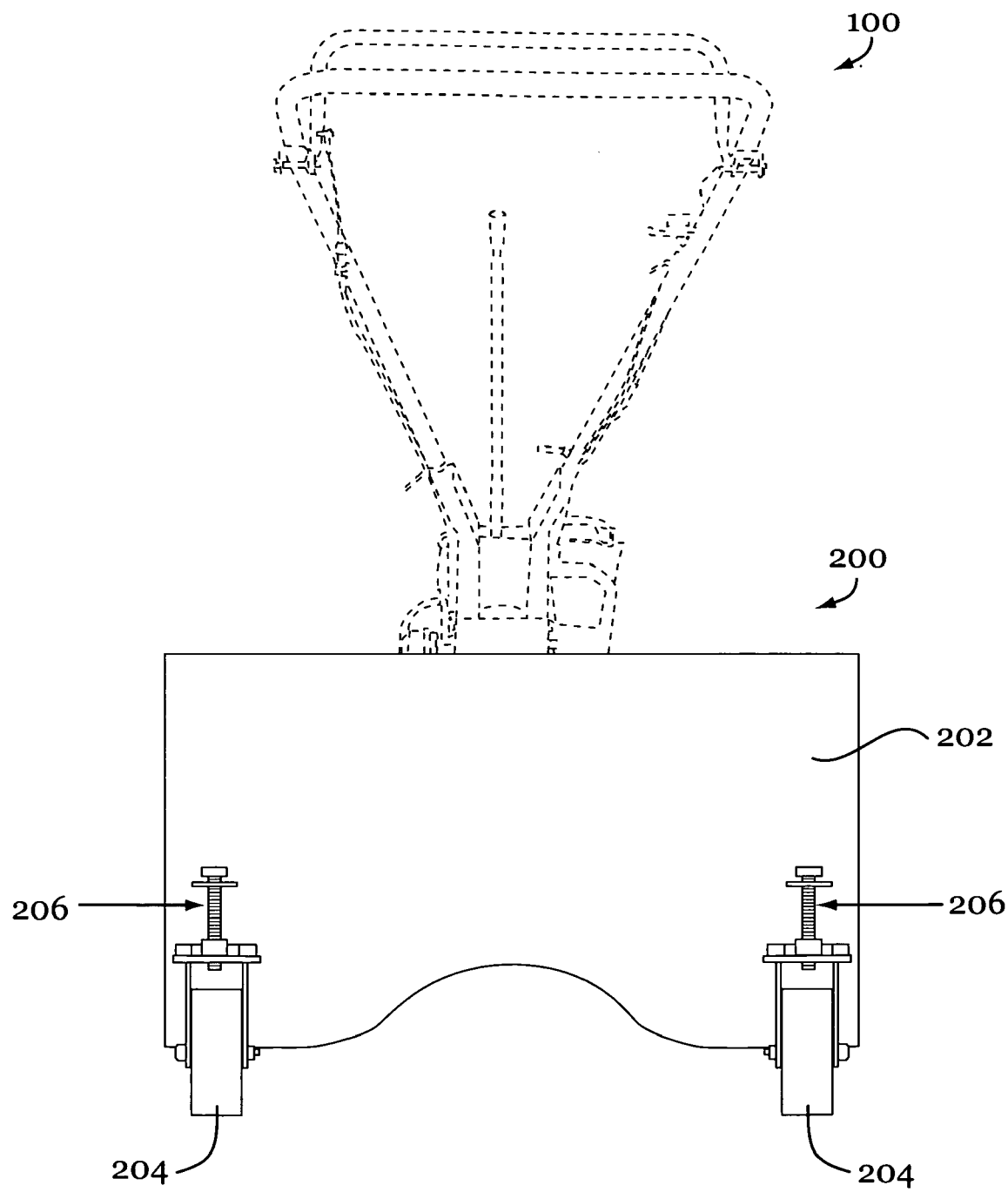
FIG. 3 is a rear elevational view of the seed row shaper of FIG. 2.
Figure 4:
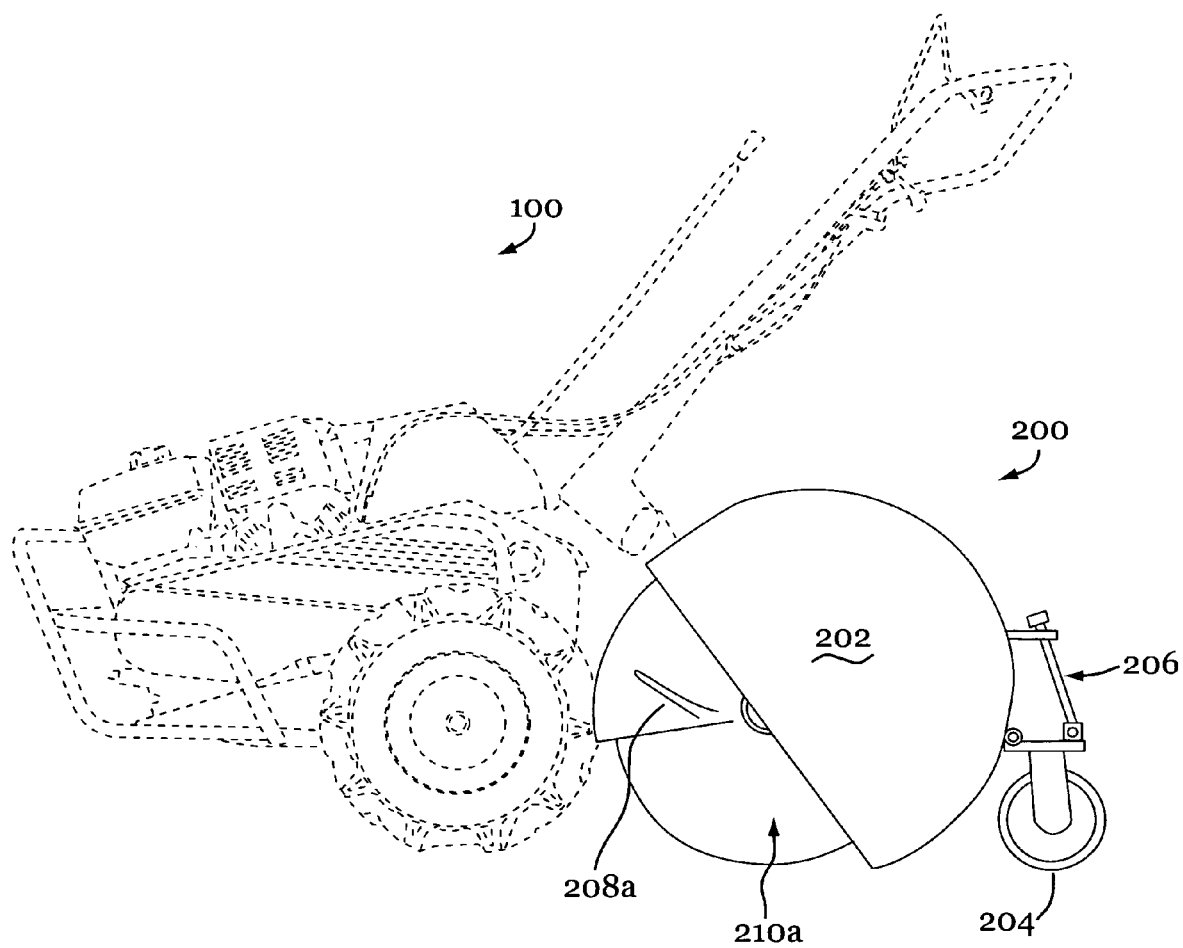
FIG. 4 is a side elevational view of the seed row shaper of FIGS. 2 and 3.

Referring now to FIGS. 2, 3, and 4 there are shown rear perspective, rear elevational, and side elevational views, respectively of a walk-behind power tiller 100 having a novel seed row forming attachment 200 connected thereto. Seed row forming attachment 200 has a protective housing 202 in place over augers 208a, 208b.

Figure 5:
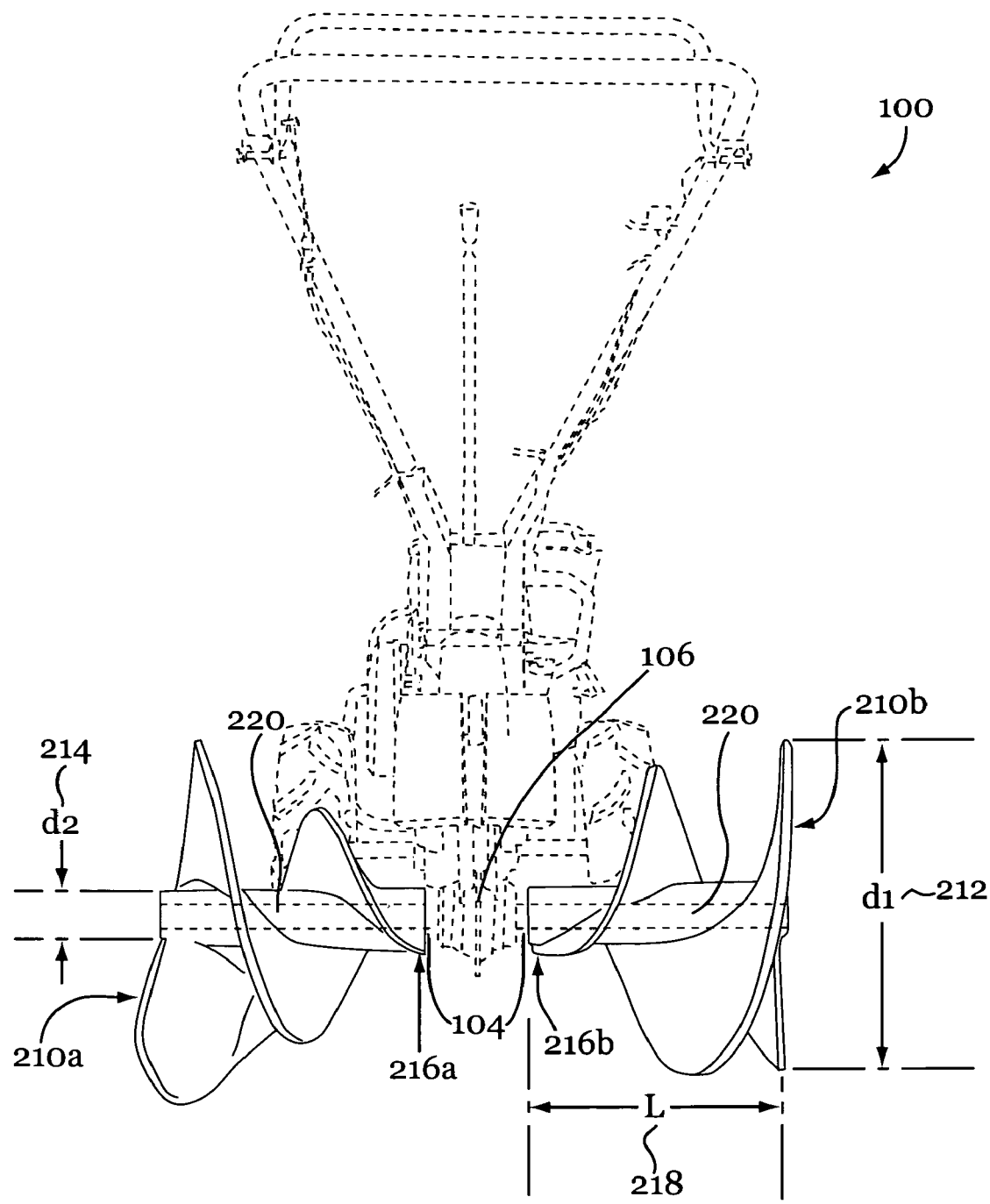
FIG. 5 is a rear elevational view of the seed row shaper of FIG. 3 with its outer, protective housing removed.
Figure 6:
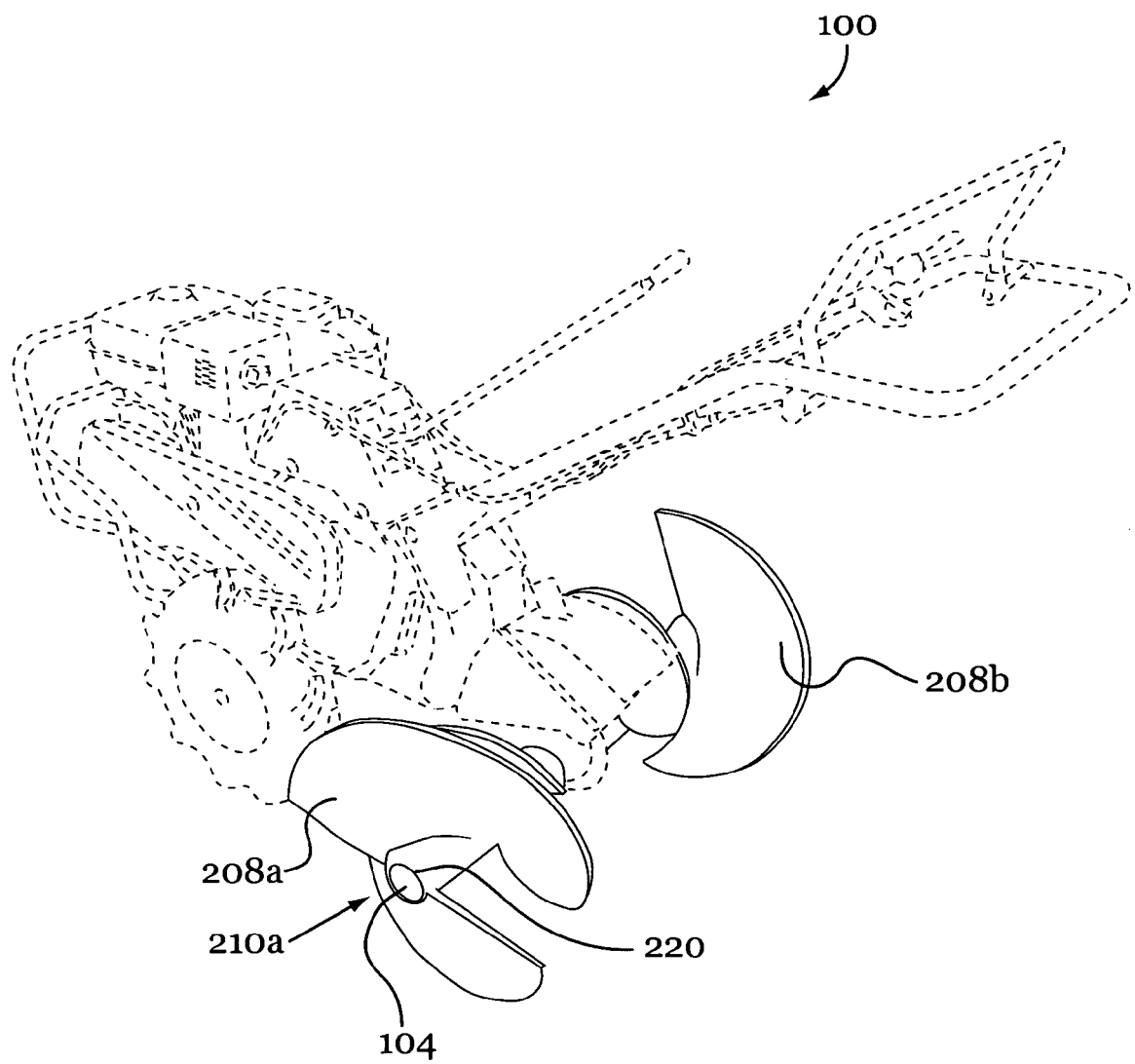
FIG. 6 is a rear perspective view of the seed row shaper of FIG. 5.
Figure 7:
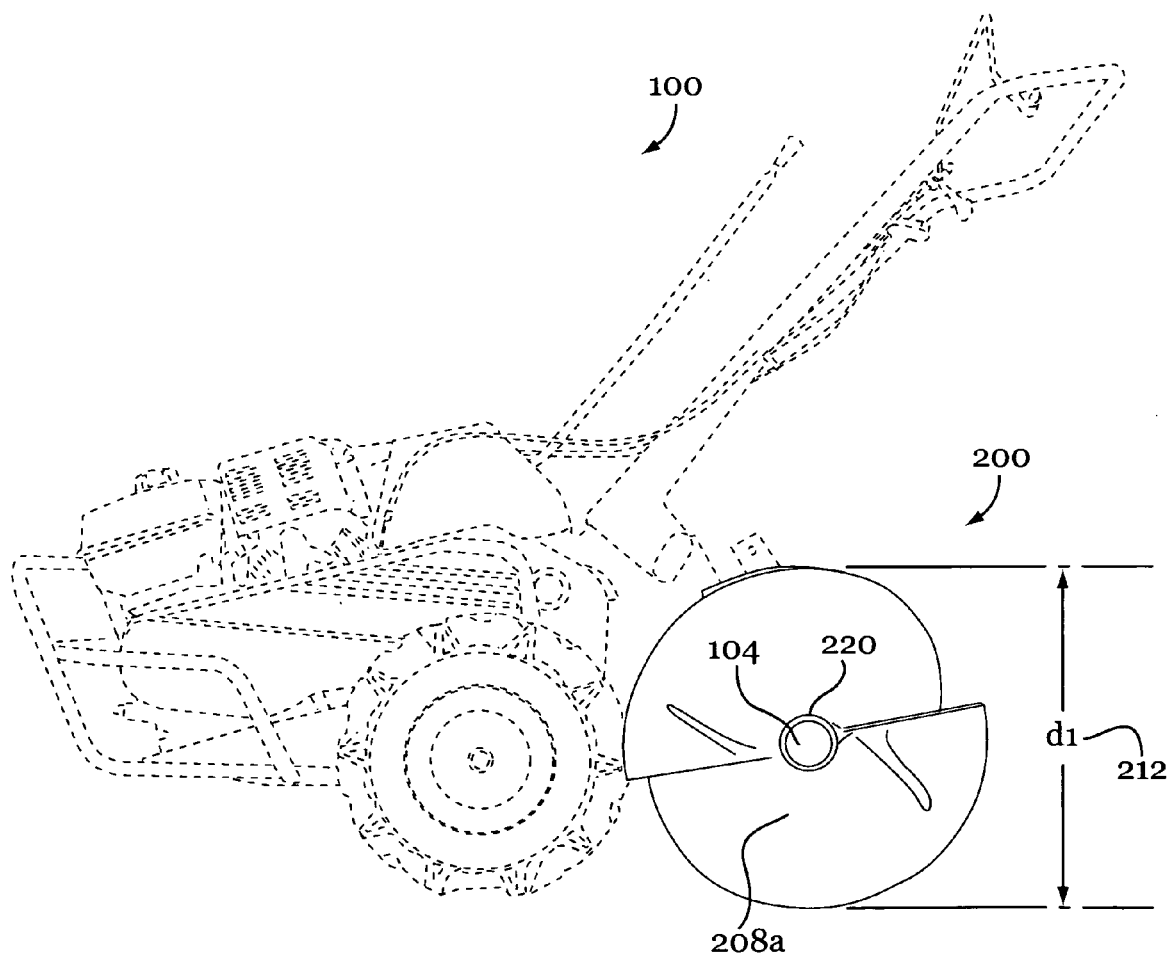
FIG. 7 is a side elevational view of the seed row shaper of FIGS. 5 and 6.

Rear wheels 204 along with an adjusting mechanism 206 are connected to housing 202 and may be used to raise and lower the rear of seed row forming attachment 200 thereby controlling the depth of cut of augers 208a, 208b (FIGS. 5, 6, 7). The outer end 210a of auger 208a may best be seen in FIGS. 2 and 4. While an adjusting screw/captive nut mechanism is shown for purposes of disclosure, adjusting mechanism may be implemented in many different ways believed to be well known to those of skill in the art. Consequently, the invention is not considered limited to the particular mechanism 206 chosen for purposes of disclosure. Rather, the invention comprehends any and all adjusting mechanisms suitable for raising and lowering rear wheels 204.

Referring now to FIGS. 5, 6, and 7, there are shown rear elevational, rear perspective, and side elevational views, respectively with a walk-behind power tiller 100 having the novel seed row forming attachment 200 attached thereto. Protective housing 202 (FIGS. 2, 3, 4) is removed to reveal the details of augers 208a, 208b. Augers 208a, 208b are attached to left and right segments, respectively, of axle 104 which forms no part of the present invention. The designations left and right are as viewed from the rear of tiller 100. Each augers 208a, 208b has a centrally disposed, axle-receiving opening 220 along a major axis thereof. This axle-receiving opening 220 may extend completely through each auger 208a, 208b or, alternately, may extend only partially into augers 208a, 208b. The choice of the length of the axle-receiving opening 220 is determined by the specific construction of axle 104 present on a specific tiller 100.

Axle 104 may be a continuous axle or may have discrete right and left portions, not specifically identified.

Axle 104 may have a substantially circular cross section or have a non-circular cross section. The cross sectional shape of axle receiving opening 220 is, of course, determined by the cross sectional shape of axle 104. When a substantially circular cross section is chosen, a locking device such as a keyway and key, neither shown, may be added to prevent rotation of augers 208a, 208b relative to axle 104. In still other embodiments, axle 104 may have a splined portion, not shown, disposed to prevent rotation of augers 208a, 208b on axle 104. It is believed that both key/keyway and spline devices are well known to those of skill in the art are not further described herein. It will further be recognized that other anti-rotation devices are believed to be know to those of skill in the art, none of which are shown, any of which may be utilized to prevent rotation of augers 208a, 208b on axle 104. Consequently, the invention includes any and all such devices and techniques for preventing rotation of augers 208a, 208b on axle 104.

Augers 208a, 208b are attached to axle 104 using any conventional attachment means known to those of skill in the art. For example, a cotter pin, lynchpin, one or more through bolts, etc. or similar devices may be utilized. In the embodiment chosen for purposes of disclosure, two bolts 222 are used to affix augers 208a, 208b to axle 104. Typically, augers 208a, 208b are removably attached to axle 104. However, in alternate embodiments, augers 208, 208b may be permanently attached to axle 104.

Each auger 208a, 208b has a respective outer end 210a, 210b having a first diameter $d_1$ 212 thereat. Augers 208a, 208b taper to a second diameter $d_2$ 214 at respective inner ends 216a, 216b thereof. Augers 208a, 208b are mirror images of one another and each have a length "l" 218 between respective outer ends 210a, 210b and inner ends 216a, 216b.

Figure 8:
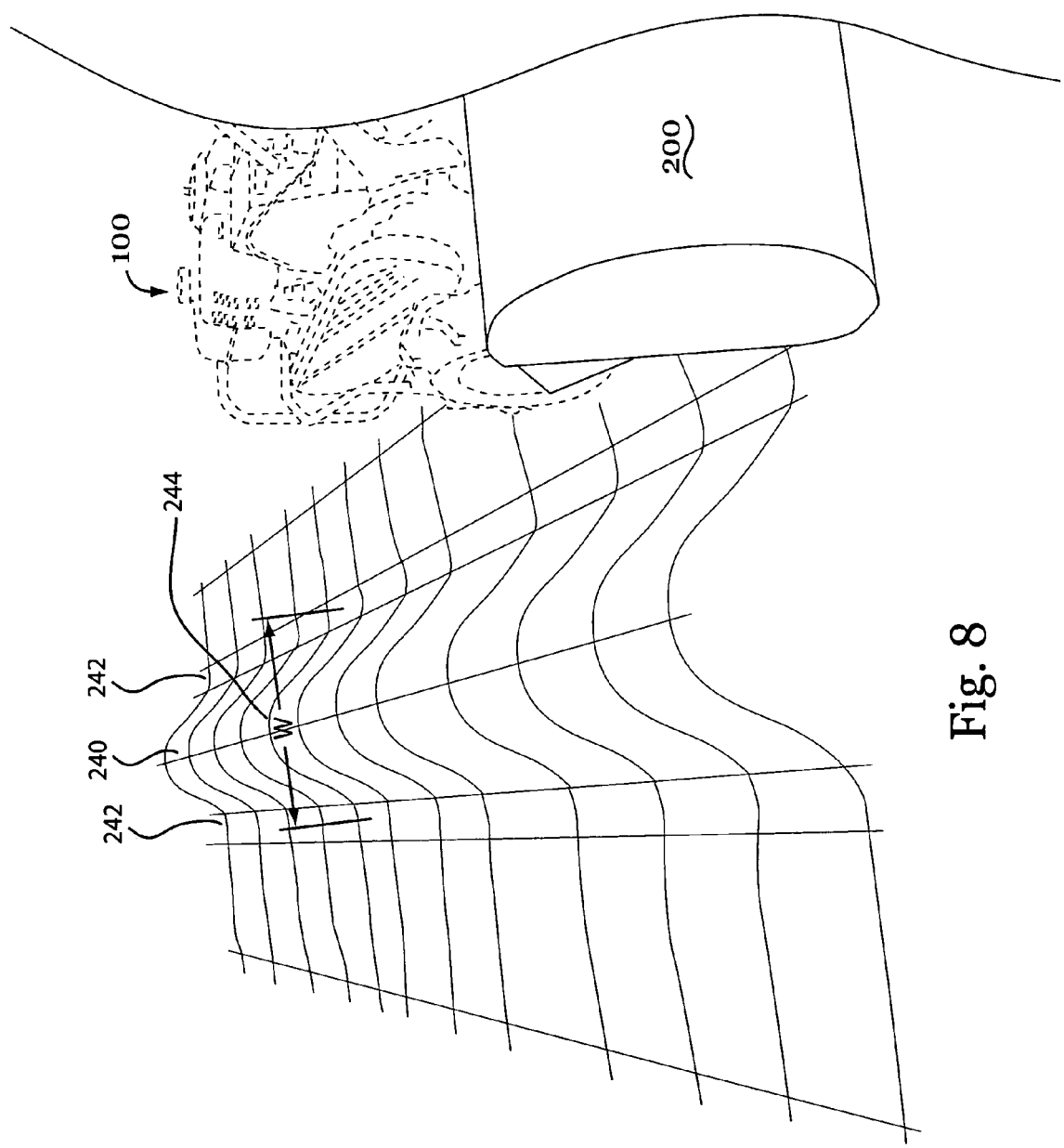
FIG. 8 is a schematic view of a seed row and surrounding furrows formed by the seed row shaper of the invention.

Referring now also to FIG. 8, there is shown a schematic representation of a berm 240 and furrows 242 formed using the seed row forming attachment 200 of the present invention. The relationship among length "l" 218, the ratio of $d_1$ 212 and $d_2$ 214, and the rate of taper controls the geometry of the berm 240. Each berm 240 has a width "w" 244 that is approximately two times the length "l" plus the spacing occupied between respective inner ends 216a, 216b by drive mechanism 106 (FIG. 5). The spacing of berms 240 as well as the width of furrows 242 may be controlled by the operator, not shown, of tiller 100.

While a pair of symmetrical augers 208a, 208b have been shown for purposes of disclosure, in alternate embodiments a single auger 208a or 208b could be implemented; In still other embodiments, a single auger incorporating the combined geometry of augers 208*a*, 208*b* could be substituted therefor.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A seed row forming apparatus, comprising:
   a) at least one auger having an outer end having a first, outer diameter and an inner end having a second inner diameter, said inner end being disposed apart from said outer end, said first outer diameter being larger than said second inner diameter;
   b) a central, axle-receiving opening having a predetermined cross-sectional shape disposed in said at least one auger parallel to a major axis thereof adapted to receive an axle therein; and
   c) means for rigidly attaching said at least one auger to said axle disposed in said axle-receiving opening; whereby a berm is formed between said outer ends of said at least one auger.

2. The seed row forming apparatus as recited in claim 1, wherein said means for rigidly attaching said at least one auger to said axle comprises means for removably attaching said at least one auger to an axle.

3. The seed row forming apparatus as recited in claim 1, wherein said means for removably attaching said at least one auger to said axle comprises at least one selected from the group: setscrew, cotter pin, lynch pin, and through-bolt.

4. The seed row forming apparatus as recited in claim 1, further comprising means for preventing rotation of said at least one auger relative to said axle, said means for preventing rotation being operatively connected to at least one of said auger and said axle.

5. The seed row forming apparatus as recited in claim 1, wherein said predetermined cross-sectional shape of said axle-receiving opening is selected from the group: substantially circular, and non-circular.

6. The seed row forming apparatus as recited in claim 1, wherein said axle-receiving opening is disposed completely through said at least one auger.

7. The seed row forming apparatus as recited in claim 1, further comprising:
   d) a protective housing disposed to substantially enclose a non-ground engaging portion of said at least one auger and rigidly affixed to a tiller powering said at least one auger; and
   e) at least one wheel disposed at a trailing edge of said protective housing.

8. The seed row forming apparatus as recited in claim 7, wherein said at least one wheel comprises a height-adjusting mechanism operatively connected thereto and to said protective housing, whereby an interaction depth of said at least one auger is selectively varied to control a dimension of a berm formed by said at least one auger.

9. A seed row forming apparatus, comprising: a pair of augers each having an outer end having a first, outer diameter and an inner end having a second inner diameter, said inner end being disposed apart from said outer end, said first outer diameter being larger than said second inner diameter, each of said pair of augers comprising a central, axle-receiving opening having a predetermined cross-sectional shape disposed there parallel to a major axis thereof adapted to receive an axle therein, each of said pair of augers being removably disposed and operatively connected in a mirror image arrangement on a respective axle protruding from an opposing side of a central transmission of a tiller to which said seed row forming apparatus is affixed, whereby a berm is formed between respective ones of said outer ends of said pair of augers.

* * * * *